United States Patent
Bedwell et al.

[11] 3,963,607
[45] June 15, 1976

[54] LOADING AND CLEANING ELEVATOR FOR HARVESTERS

[75] Inventors: Thomas A. Bedwell, Providence; Doyle D. Zollinger, Millville, both of Utah

[73] Assignee: Hesston Corporation, Hesston, Kans.

[22] Filed: May 28, 1974

[21] Appl. No.: 473,997

[52] U.S. Cl. .............................. 209/73; 209/99; 198/172; 15/3.16
[51] Int. Cl.² ........................................ B65G 19/18
[58] Field of Search .............. 209/73, 98, 99, 100, 209/106, 107; 15/3.1, 3.11, 3.16; 198/175, 176, 173, 171, 172

[56] References Cited
UNITED STATES PATENTS

| | | | |
|---|---|---|---|
| 1,226,156 | 5/1917 | Wilson | 198/176 |
| 3,011,635 | 12/1961 | Jovin | 209/107 |
| 3,211,289 | 10/1965 | Brumagin | 209/99 |
| 3,279,601 | 10/1966 | James | 209/99 |
| 3,506,123 | 4/1970 | Ranger | 209/99 X |
| 3,629,890 | 12/1971 | Harris | 15/3.11 |

Primary Examiner—Robert B. Reeves
Assistant Examiner—Joseph J. Rolla
Attorney, Agent, or Firm—Schmidt, Johnson, Hovey & Williams

[57] ABSTRACT

An elevator such as for loading harvested crops into an awaiting receptacle employs chain-driven, fingered flights that roll and tumble the crops up an inclined grill consisting of laterally spaced-apart rods so that dirt and other trash material are dislodged from the crops by the aggressive tumbling action for discharge through the open spaces between the rods. Tumbling of the crops and movement of the same along the rods causes the latter to vibrate in a multitude of directions and relative to one another whereby to aid in dislodging refuse from the crops, while the fingers of each flight project between adjacent rods to maintain the latter clear of accumulated refuse throughout the elevating process. The rods are transversely ribbed adjacent the delivery end of the elevator whereby to increase tumbling and agitation of the crop as the latter moves across such ribs. Each flight is mounted on the drive chains therefor in a manner to cause the flights to lean forwardly out of a normal position as they move around the lower, loading end of their path of travel, hence placing such flights in early condition to receive and retain crops presented to the elevator at the lower end thereof.

2 Claims, 6 Drawing Figures

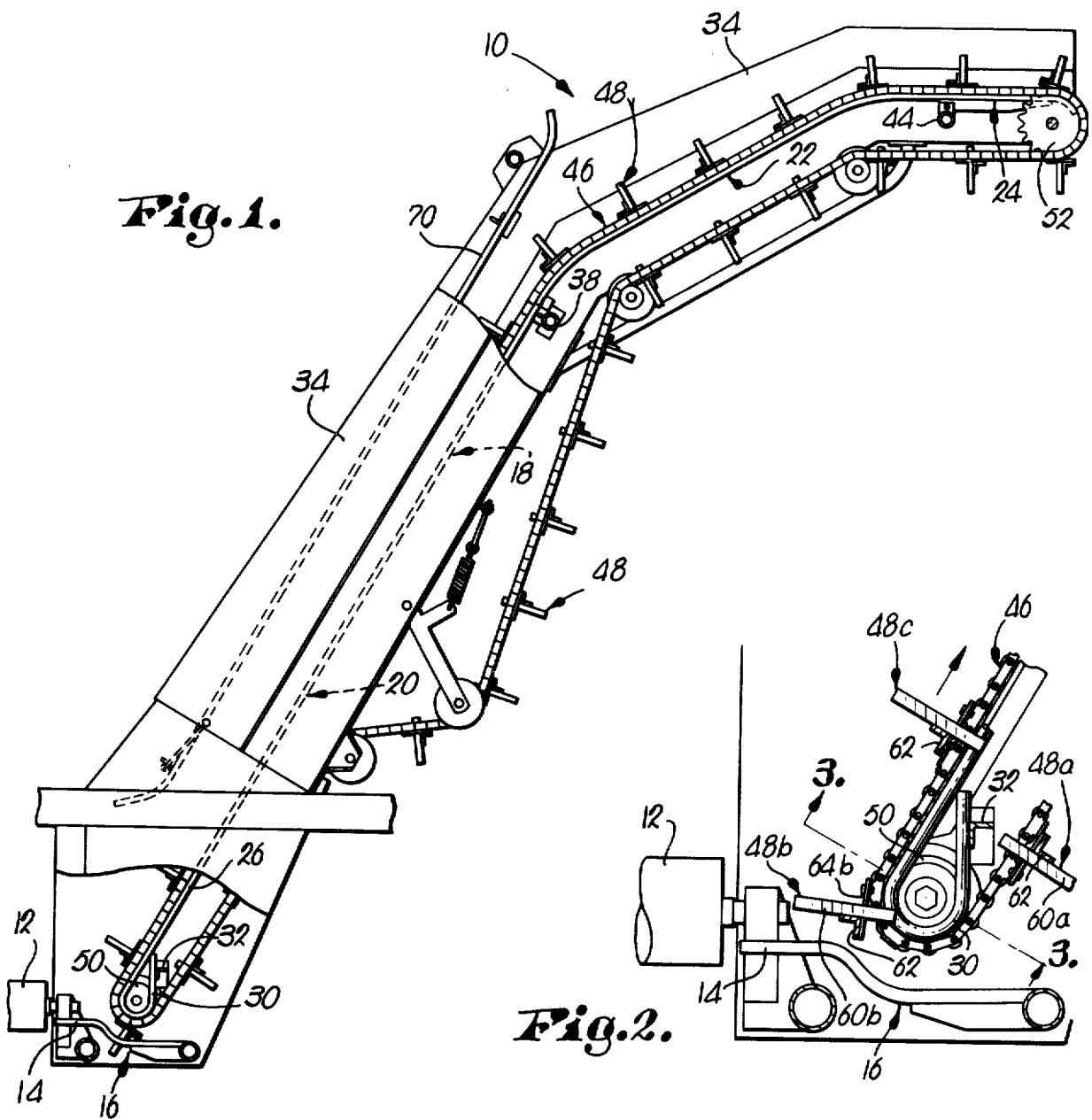
Fig.1.
Fig.2.
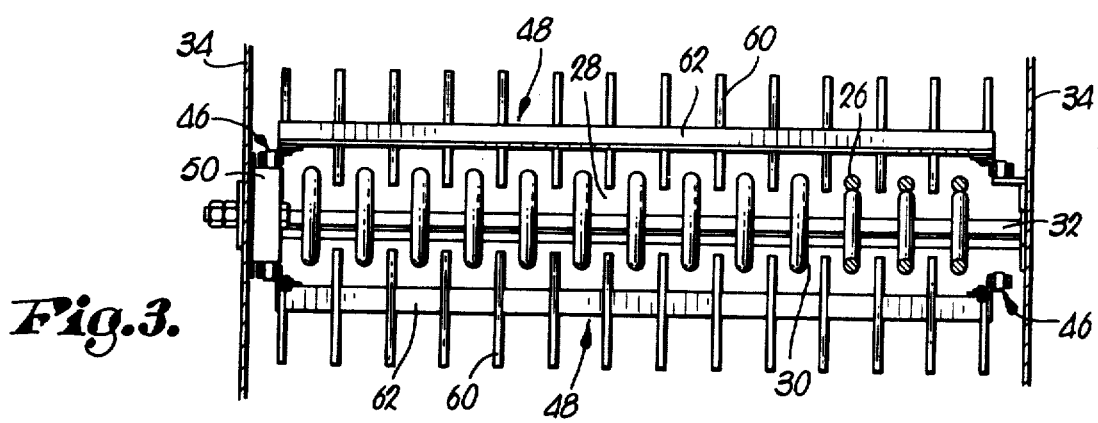
Fig.3.

LOADING AND CLEANING ELEVATOR FOR HARVESTERS

This invention relates to improvements in crop conveying apparatus and particularly to improvements in elevating apparatus used in conjunction with a sugar beet harvester for conveying the harvested beets upwardly from the cleaning rolls of the harvester for dumping into an awaiting vehicle.

Elevators of this type have for many years employed the so-called "spud chain" conveyor for cleaning and moving freshly harvested sugar beets or other crops from the relatively low level of the harvester to a point high enough that the crops can be delivered directly into the top of a vehicle disposed adjacent to the harvester. An example of this type of spud chain conveyor is found in U.S. Pat. No. 2,743,005, issued to E. C. Rollins on Apr. 24, 1956.

Typical spud chain conveyors consist of generally U-shaped links having integral hooks at their free ends which are looped swingably over the bight of the next adjacent link so that a highly flexible conveying web is presented having a large percentage of open area through which dirt and other refuse can pass as the crops are carried along by the conveyor. Flights of fingers are mounted on the conveyor at spaced intervals therealong to retain crops on the conveyor as the latter is driven in a direction to deliver the crops to the vehicle, and the flexing action of the conveyor as it is advanced produces a degree of cleaning of the crops just prior to their being loaded into the vehicle.

With today's faster harvesting speeds, however, the loose-jointed spud chain conveyor has proven to be less than totally reliable because it becomes difficult to control and produces uneven wear, link stretching and bending, and frequent breakage. When a chain failure does occur, in many instances the operator may be unable to shutdown the conveyor rapidly enough to avoid entanglement and twisting of broken links with normal ones, causing extensive repairs and appreciable expense.

Accordingly, one important object of this invention is to provide a sturdy, well-controlled and mechanically trouble-free alternative to the breakage-prone spud chain conveyor which alternative, while capable of operating smoothly and efficiently at today's faster harvesting speeds, does not sacrifice cleaning quality for delivery speed.

Pursuant to the foregoing, another important object of this invention to depart from the principles of the spud chain conveyor wherein the crop is carried in a relatively calm, immobilized condition to a delivery point, and utilize instead the principle of aggressively tumbling and pushing the crop along a stationary, apertured support so that dirt and trash material are dislodged from the crop during its tumbled advancement and are discharged readily through the openings in the support.

A further important object of the instant invention is the provision of laterally spaced-apart rods, forming an underlying grill support for the crop as it is advanced, so mounted that multi-directional vibrations are induced therein during crop advancement which augment the cleaning action afforded by tumbling the crop.

Additionally, an important object of the invention is to provide transversely extending ribs on the rods which drag against the crop as it passes over the ribs to increase the tumbling and rolling action imparted to the crop.

Another important object of this invention is to render the conveyor substantially self-cleaning by virtue of fingers which travel between adjacent rods of the grill to maintain the same continuously cleared of dirt, rocks and other trash material which would otherwise tend to collect between the rods.

In addition, a further important object of this invention is to provide improved pickup and retaining of crops which are presented to the conveyor at the loading end thereof.

In the drawings:

FIG. 1 is a side elevational view of a crop-loading and cleaning elevator employing the principles of the present invention, portions of the side of the elevator being broken away to reveal details of construction;

FIG. 2 is an enlarged, fragmentary, detail view of the elevator and adjacent mechanism at the loading end of the elevator;

FIG. 3 is a cross-sectional view through the elevator taken along line 3—3 of FIG. 2;

Figure 4:
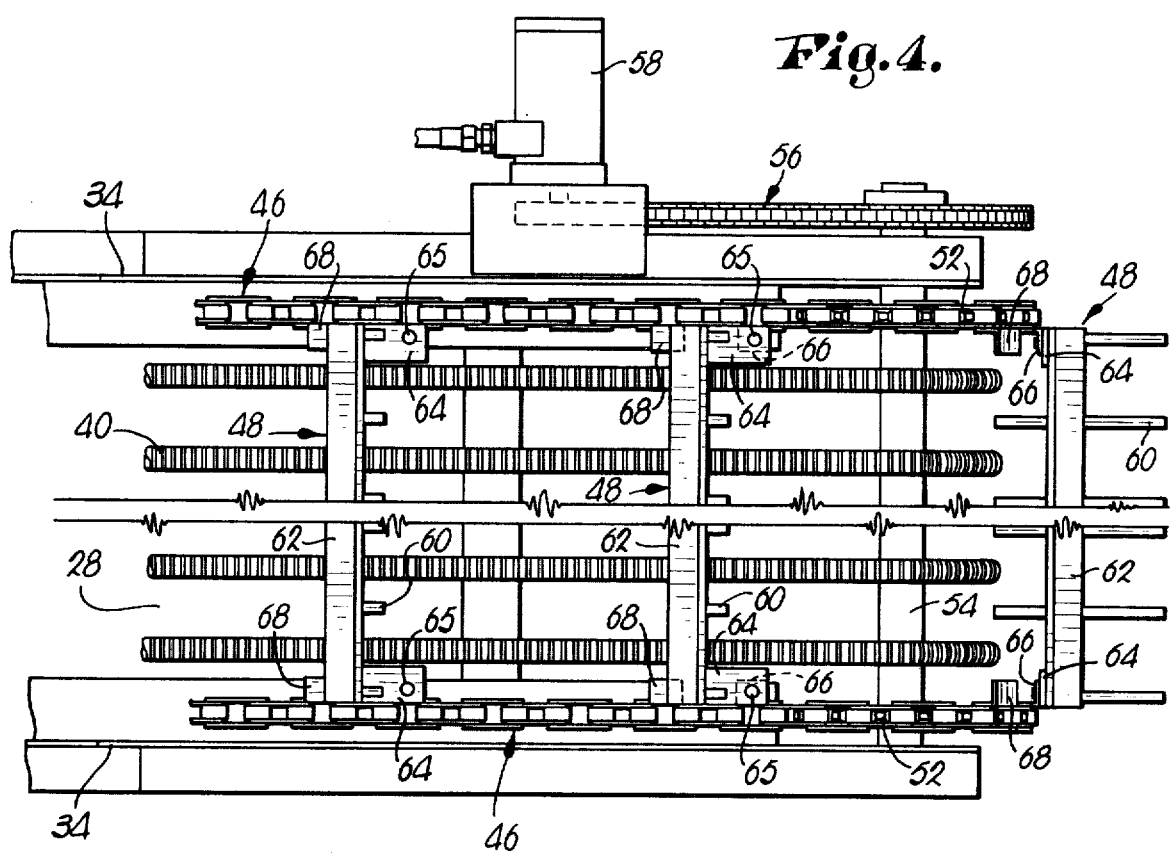
FIG. 4 is an enlarged, top plan view of the elevator adjacent its delivery end.

The elevator 10 forms a part of a harvesting machine (not shown) which includes apparatus for harvesting the crop, such as sugar beets, and initially subjecting the same to a cleaning action on a series of rotating rolls, one of which is fragmentarily shown in FIGS. 1 and 2 and is denoted by the numeral 12. From the rolls 12, the beets are discharged onto the flat terminal section 14 of adjacent comb structure 16, whereupon the beets await pickup and elevation of elevator 10.

The elevator 10 has a grill support 18 which is inclined upwardly as illustrated best in FIG. 1, having a first, lower section 20 that leads upwardly from adjacent the cleaning rolls 12 at a first angle, a second section 22 above lower section 20 leading less steeply therefrom, and a final section 24 leading from section 22 in substantially a horizontal direction. The lower section 20 of grill 18 consists of a number of laterally spaced-apart rod members 26 defining trash discharge openings or spaces 28 therebetween and having downturned loops 30 at their lowermost ends which are affixed to a cross-bar 32 extending between the opposed sidewalls 34 of elevator 10. The uppermost ends of rods 26 each have a mounting ear 36 (FIGS. 5 and 6) affixed thereto which securely mount rods 26 on a cross pipe 38 between walls 34 in such a manner that rods 26 are spaced a distance above cross pipe 38. As shown best in FIG. 1, no supports are provided for rods 26 between cross-bar 32 and cross pipe 38 so that the entire lengths of rods 26 between bar 32 and pipe 38 are free to yield resiliently upon the application of deflecting forces to the rods 26. Thus, the rods 26 may vibrate and flex to an extent in many different directions and relative to one another, which is highly significant with regard to cleaning of the beets as will hereinafter be more fully discussed.

Figure 5:
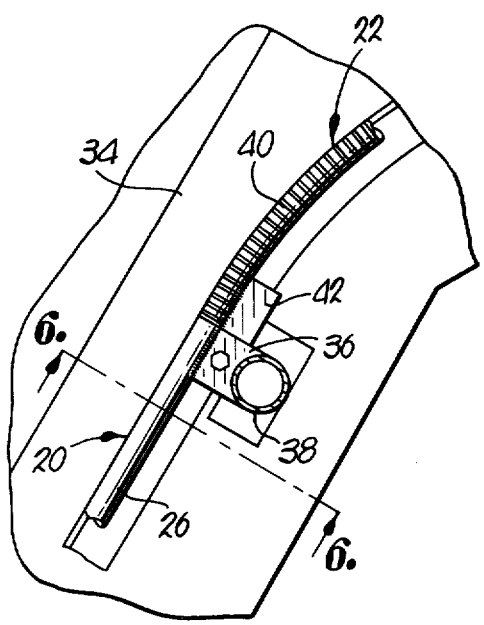
FIG. 5 is an enlarged, fragmentary detail view of the supporting grill of the elevator intermediate the opposed ends thereof.
Figure 6:
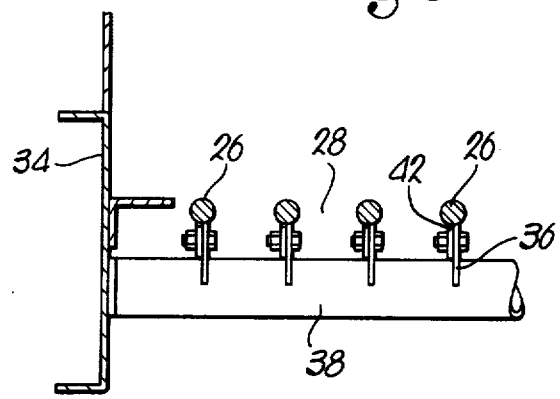
FIG. 6 is fragmentary, cross-sectional view through the grill taken along line 6—6 of FIG. 5.

The rods 26 of lower section 20 are smooth, while a second set of rods 40, forming sections 22 and 24 and aligned end-to-end with rods 26, are transversely ribbed as illustrated best in FIGS. 4 and 5. This also is advantageous from the standpoint of cleaning.

Rods 40 are laterally spaced to the same extent as rods 26, and each is supported only at its opposed ends in a manner similar to rods 26, so that a degree of vibratory action can also be experienced by rods 40. In this respect, as shown in FIG. 5, each rod 40 is provided at its lowermost end with an ear 42 that is disposed alongside of and bolted to the ear 36 of an aligned rod 26, while at their upper ends, the rods 40 are similarly supported by a cross pipe 44.

The beets discharged from cleaning rolls 12 are advanced up grill 18 by a mover in the nature of a pair of endless roller chain elements 46 disposed on opposite, lateral sides of grill 18 and interconnected by crop-engaging flight structures 48 spanning chains 46 at spaced intervals therealong. At its lower end, each chain 46 is looped about guide means in the nature of a conventional cone roller 50 essentially concentric with the loops 30 of rods 26 while, at its upper, delivery end, each chain 46 is looped about a drive sprocked 52. The sprockets 52 are mounted on a common drive shaft 54 (FIG. 4) which is coupled through a chain and sprocket assembly 56 with a hydraulic motor 58 for operating chains 46.

Each flight 48 has a series of fingers 60 spaced apart along a common mounting bar 62 which spans the chains 46 for passage above grill 18 along the elevating stretches of chains 46. The fingers 60 are oriented to project downwardly between the rods 26 and 40 of grill 18 as illustrated in FIG. 3 along the elevating stretches of chains 46, the fingers 60 being spaced substantially beneath grill 18 along the return stretches of chains 46 as shown in FIG. 1.

Each mounting bar 62 in turn has a pair of plate-like, fore-and-aft extending mounts 64 (FIG. 4) at opposite ends thereof which underlie the same and project for a limited distance ahead of fingers 60. Each mount 64 is, in turn, connected by a fastener 65 to an underlying lug 66 extending laterally from the corresponding chain 46 at the front end of mount 64, while the rear terminal end of each mount 64 loosely overlies a rest 68 projecting laterally from the corresponding chain 46. Thus, the fingers 60 of each flight 48 are located intermediate the opposed ends of its mounts 64, are located rearwardly of their points of connection to chain 46, and are free to lift from rests 68 as flights 48 move around cone rollers 50 and drive sprockets 52, as illustrated in FIG. 2.

OPERATION

As the fingers 60 of each flight 48 sweep through the teeth of comb 16, the fingers 60 engage and lift the beets or other crop items presented to comb 16 by rolls 12. The lifted beets are cradled between the flight 48 and grill 18 whereby, upon further advancement of chains 46, the beets are pushed upwardly along grill 18 toward the uppermost delivery end of elevator 10.

By examining FIG. 2 it can be seen that as a flight 48a approaches cone roller 50, the fingers 60a thereof are disposed in what will hereinafter be referred to as their normal position perpendicular to the chains 46. As a flight such as 48b moves around the rollers 50 and sweeps through comb 16, however, the fingers 60b thereof lean forwardly out of their normal position as mount 64b lifts off its rear rests 68. In this manner, the fingers 60b are prepared to properly lift and retain the beets from rolls 12 at an earlier point in their path of travel than if they remained in their normal position, extending generally radially from the axis of rollers 50 during movement therearound. Hence, there is little tendency for the fingers 60b to kick the beets back onto the rolls 12, which greatly reduces the likelihood of clogging and overloading of this particular area of the harvester. The loading of elevator 10 can be carried out in an orderly, smooth manner without damaging the beets or the equipment.

After completing the turn around rollers 50, the flights return to their normal positions such as illustrated by flight 48c in FIG. 2. Beets which are disposed ahead of and in engagement with flight 48c are then moved up elevator 10 along grill 18.

As the beets are advanced upwardly along grill 18 by flights 48, they are rolled and tumbled aggressively so as to dislodge associated dirt and trash materials from the beets. Such tumbling action is contained by an overlying grate 70 of conventional design above section 20 of grill 18, and the residue that is removed from the beets simply drops through openings 28 between rods 26 and 40 whereby to provide an easy means of removing and separating such refuse from the tumbling beets.

Such tumbling action imparted to the beets also induces vibration in the rods 26 and 40 in many different directions and to varying extents between the individual rods 26 and 40. Certain of the rods 26 and 40 may vibrate up-and-down, while others may vibrate in-and-out and at different frequencies than adjacent rods, all of which greatly enhances the cleaning action applied to the beets. Moreover, such vibration and movement of rods 26 and 40 helps maintain the same clear of accumulated dirt, rocks and other trash materials.

Such accumulation of refuse is further avoided by virtue of the fact that the fingers 60 of the flights ride between rods 26 and 40 during the elevation process so that any refuse which tends to become jammed between rods 26 and 40 is quickly driven out of grill 18 and forced to drop therefrom onto the ground. Hence, elevator 10 is substantially self-cleaning, which manifestly results in maximizing operating efficiency because of the absence of any need to periodically shutdown the equipment for cleaning purposes.

Additional agitation is imparted to the beets as they leave the smooth rods 26 and move across the ribs of rods 40. Such ribs have a tendency to increase the drag applied by rods 40 against the beets, and this increased drag, coupled with a continued effort on the part of the fingers 60 to advance the beets, assures aggressive tumbling of the beets to remove any caked-on dirt that may have been missed by rods 26. Thus, the beets which are finally discharged from elevator 10 at the uppermost delivery end thereof are well cleaned and free of caked-on dirt, foliage and clods.

Having thus described the invention what is claimed as new and desired to be secured by letters Patent is:

1. In crop conveying apparatus;
   a support having a normally upper crop engaging surface upon which crops are moved during conveyance; and
   a mover shiftable along the entire length of said support and including pushing structure having a forwardly facing crop engaging portion above said surfaces and extending continuously across the support for tumbling said crops while simultaneously advancing the same to dislodge refuse therefrom, said support being provided with means defining a plurality of refuse discharge openings along the path of travel of the crops for removing refuse dislodged from said crops during conveyance, said opening-defining means including a plurality of elongated, laterally spaced-apart members extending along said path beneath said mover, said members being mounted for vibration thereof as said crops are tumbled therealong whereby to augment the refuse-dislodging action of said mover, said mover having means for clearing said openings of clogged refuse, said refuse-clearing means including a plurality of fingers projecting downwardly between adjacent members of the support, said support being further provided with a transversely extending undersupport for said members, each of said members having a downwardly extending ear securing said members to said undersupport in upwardly-spaced relationship to present a clearance trough for said fingers permitting the latter to pass unhindered over said undersupport.

2. In crop handling apparatus:

a generally horizontally extending, crop-supporting comb having a series of spaced apart teeth disposed to underlie crops deposited on the comb;

a pair of spaced apart circular guides mounted above said comb for rotation about aligned horizontal axes;

a pair of endless, flexible elements looped about said guides and extending upwardly therefrom in laterally spaced apart relationship;

a crop lifter spanning said elements and including a row of spaced apart fingers disposed to sweep between said teeth of the comb when the elements are driven around said guides; and a pair of flat mounts attached to said elements and securing opposite ends of said lifter thereto for advancement of the lifter with the elements, said mounts each having only their normally leading ends attached to the respective elements with their normally trailing ends free to move transversely outwardly with respect to the elements, said fingers being spaced rearwardly from said leading ends of the mounts whereby to lean forwardly and quickly approach a horizontal condition between the teeth of said comb as the lifter moves around said guides with the elements.

\* \* \* \* \*